US011157319B2

(12) United States Patent
Dubeyko et al.

(10) Patent No.: US 11,157,319 B2
(45) Date of Patent: Oct. 26, 2021

(54) PROCESSOR WITH PROCESSOR MEMORY PAIRS FOR IMPROVED PROCESS SWITCHING AND METHODS THEREOF

(71) Applicant: Western Digital Technologies, Inc., San Jose, CA (US)

(72) Inventors: Viacheslav Dubeyko, San Jose, CA (US); Luis Cargnini, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 300 days.

(21) Appl. No.: 16/001,635

(22) Filed: Jun. 6, 2018

(65) Prior Publication Data

US 2019/0377607 A1   Dec. 12, 2019

(51) Int. Cl.
*G06F 9/46*   (2006.01)
*G06F 9/50*   (2006.01)
*G06F 9/48*   (2006.01)
*G06F 12/1027*   (2016.01)

(52) U.S. Cl.
CPC .......... *G06F 9/5016* (2013.01); *G06F 9/4881* (2013.01); *G06F 12/1027* (2013.01); *G06F 2212/202* (2013.01)

(58) Field of Classification Search
CPC .. G06F 9/5016; G06F 9/4881; G06F 12/1027; G06F 2212/202
See application file for complete search history.

(56) References Cited

U.S. PATENT DOCUMENTS

| | | | |
|---|---|---|---|
| 5,640,533 A * | 6/1997 | Hays | G06F 12/1027 711/133 |
| 6,101,599 A | 8/2000 | Wright et al. | |
| 6,560,674 B1 | 5/2003 | Hosogi et al. | |
| 7,979,632 B2 * | 7/2011 | Alvarez | G06F 11/1076 711/100 |
| 8,209,488 B2 * | 6/2012 | Arimilli | G06F 12/0897 711/137 |
| 9,081,660 B2 | 7/2015 | Thomas | |
| 9,128,824 B2 | 9/2015 | Gries et al. | |
| 10,210,167 B1 * | 2/2019 | Sorenson, III | G06F 3/061 |

(Continued)

FOREIGN PATENT DOCUMENTS

EP   3293638 A1   3/2018

OTHER PUBLICATIONS

International Search Report and Written Opinion dated Jul. 4, 2019 from counterpart International Application No. PCT/US2019/024221, 8 pages.

(Continued)

*Primary Examiner* — Wissam Rashid
(74) *Attorney, Agent, or Firm* — Barry IP Law, P.C.

(57) ABSTRACT

A processor includes processor memory arrays including one or more volatile memory arrays and one or more Non-Volatile Memory (NVM) arrays. Volatile memory locations in the one or more volatile memory arrays are paired with respective NVM locations in the one or more NVM arrays to form processor memory pairs. Process data is stored for different processes executed by at least one core of the processor in respective processor memory pairs. Processes are executed using the at least one core to directly access the process data stored in the respective processor memory pairs.

19 Claims, 8 Drawing Sheets

(56) References Cited

U.S. PATENT DOCUMENTS

| | | | |
|---|---|---|---|
| 10,606,513 B2 | 3/2020 | Dubeyko et al. | |
| 10,811,336 B2 * | 10/2020 | Pillarisetty | H01L 35/16 |
| 2005/0132363 A1 * | 6/2005 | Tewari | G06F 9/45558 |
| | | | 718/1 |
| 2005/0169084 A1 | 8/2005 | Matsui | |
| 2007/0053220 A1 | 3/2007 | Gohou | |
| 2007/0113044 A1 | 5/2007 | Day et al. | |
| 2007/0174718 A1 | 7/2007 | Fouquet-Lapar | |
| 2008/0010442 A1 | 1/2008 | Hochschild et al. | |
| 2008/0065832 A1 * | 3/2008 | Srivastava | G06F 12/0862 |
| | | | 711/130 |
| 2008/0205146 A1 | 8/2008 | Kajigaya | |
| 2010/0115204 A1 | 5/2010 | Li et al. | |
| 2010/0223305 A1 | 9/2010 | Park et al. | |
| 2011/0113208 A1 | 5/2011 | Jouppi et al. | |
| 2013/0332660 A1 | 12/2013 | Talagala et al. | |
| 2014/0006686 A1 | 1/2014 | Chen et al. | |
| 2014/0281269 A1 | 9/2014 | Chakrabarti et al. | |
| 2015/0121105 A1 | 4/2015 | Ahn et al. | |
| 2015/0162063 A1 | 6/2015 | Mueller | |
| 2015/0178164 A1 | 6/2015 | Zhang | |
| 2015/0206574 A1 | 7/2015 | Greathouse et al. | |
| 2015/0331624 A1 | 11/2015 | Law | |
| 2016/0034225 A1 | 2/2016 | Yoon et al. | |
| 2016/0170645 A1 | 6/2016 | Kumar et al. | |
| 2017/0212687 A1 | 7/2017 | Kelly et al. | |
| 2018/0173626 A1 | 6/2018 | Banerjee et al. | |

OTHER PUBLICATIONS

Bhati et al.; "DRAM Refresh Mechanisms, Penalties, and Trade-Offs"; Jan. 2016; 14 pages; vol. 65; No. 1; IEEE Transactions on Computers; available at https://ieeexplore.ieee.org/document/7070756.

Bhati et al.; "Flexible Auto-Refresh: Enabling Scalable and Energy-Efficient DRAM Refresh Reductions"; Jun. 13-17, 2015; 12 pages; available athttps://ieeexplore.ieee.org/document/7284069.

Written Opinion dated Apr. 17, 2019 from counterpart International Application No. PCT/US2018/067121, 6 pages.

Pending U.S. Appl. No. 15/922,007, filed Mar. 15, 2018, entitled "Volatility Management for Memory Device", Viacheslav Dubeyko.

* cited by examiner

PROCESSOR WITH PROCESSOR MEMORY PAIRS FOR IMPROVED PROCESS SWITCHING AND METHODS THEREOF

BACKGROUND

A context switch generally includes storing the state of a process or a thread, so that execution of the process or the thread can be resumed at a later time from the same point where execution left off before the context switch. The term "context switch" can therefore refer to switching between the execution of different processes or switching between the execution of different threads within a process. Context switches ordinarily allow multiple tasks to be executed by a single processor core to facilitate a multitasking Operating System (OS).

The computational cost of a context switch can vary, but typically includes storing process data for a process or thread under execution in a main memory outside the processor, and loading process data for a different process or thread from the main memory into a memory location within the processor, such as into a register or a level cache (e.g., L1/L2/L3 cache). Examples of process data stored and loaded during a context switch can include a Task State Segment (TSS) for storing information about a task, and a Translation Lookaside Buffer (TLB) used to reduce the time to access a user memory location for the task. As used herein, a task can refer to a set of program instructions or a metadata structure used to account for processes and threads, that is loaded in a main memory for execution by a processor.

Conventional processors provide a relatively small set of registers with limited storage capacity, and typically only store one TSS and one TLB per process for a processor core at a given time. In contrast, modern OS's may use preemptive multitasking with the goal of executing several tasks nearly simultaneously. In preemptive multitasking, the OS determines how long to allocate resources such as a processor core to a given task before allocating the resources to another task. Preemptive multitasking can therefore be a significant source of context switches. In such examples, the OS's task scheduler distributes the processor's time slices between multiple tasks and initiates frequent context switches. Such frequent context switches can degrade the performance of processors primarily due to the increased number of load and store operations to access the main memory.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Conventional Processor Operation

Figure 1:
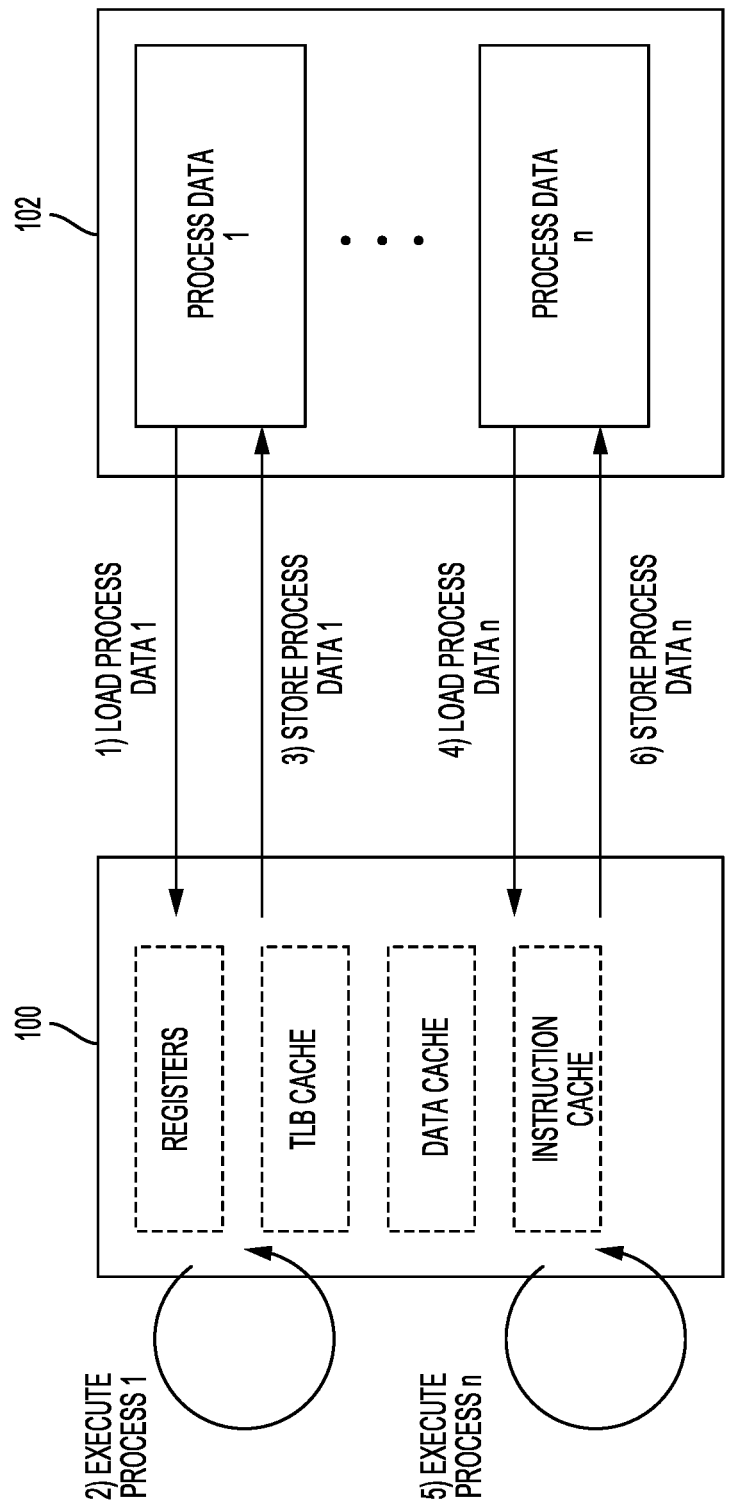
FIG. 1 illustrates an example of the conventional loading and storing of process data with a main memory during execution of processes.

FIG. 1 illustrates an example of the conventional loading of process data from, and the storing of process data in main memory 102 during execution of processes. As shown in FIG. 1, processor 100 includes registers, a Translation Lookaside Buffer (TLB) cache, a data cache, and an instruction cache. Processor 100 may include, for example, a Central Processing Unit (CPU), a Microprocessor (MPU), or a Microcontroller (MCU). Processor 100 may also be part of a System on a Chip (SoC). Main memory 102 can include, for example, a Dynamic Random-Access Memory (DRAM) or other RAM that serves as a primary storage for process data. As used herein, process data can refer to the code and other data that is used when executing a process or a thread.

The TLB cache is a memory cache that is used to store a TLB for a process being executed by the core. As noted above, the TLB is used to reduce the time taken to access a user memory location. Since each process generally has its own protected virtual address space, each process has its own TLB. In some implementations, the TLB cache may be part of a processor's Memory Management Unit (MMU). The TLB cache can store recent mappings of virtual memory to physical memory, and can be referred to as an address-translation cache.

A TLB cache may reside between a core of processor 100 and a processor level cache (e.g., L1/L2/L3 cache), between a processor level cache and main memory 102, or between different levels of the processor level caches. As shown in FIG. 1, the TLB cache is located in processor 100 among a data cache for storing data used by a process or data provided as a result of executing a process, and an instruction cache for storing portions of the code for the process or thread.

In some implementations, the TLB can be implemented as a Content Addressable Memory (CAM). In such implementations, a CAM search key can be the virtual address and the search result can be the physical address. If the requested address is present in the TLB, the CAM search can yield a match quickly, and the retrieved physical address can be used to access process data from main memory 102. This is called a TLB hit. If the requested address is not in the TLB (i.e., a TLB miss), the translation to a physical address proceeds by looking up a page table in a process called a page walk. The page walk is typically time consuming when compared to processor speed, as it involves reading the contents of multiple memory locations and using the read contents to compute a physical address. After the physical address is determined by the page walk, the virtual address to physical address mapping is entered into the TLB.

As with the TLB, each process also typically has its own Task State Segment (TSS). The TSS can include a special data structure, such as those used with x86-based processors, that holds information about a task. As used herein, and as noted above, a task can refer to a set of program instructions, such as a process or thread, that is loaded in main memory 102 for execution by processor 100. The TSS is used by an OS kernel for task management. Specifically, the TSS may store information about the task, such as a processor register state, I/O port permissions, inner-level stack pointers, and a previous TSS link from a previous session of execution. The TSS may reside in various locations, such as in main memory 102 or in a memory of processor 100, such as in registers of processor 100. In some implementations, a special segment register called the task register may hold a segment selector that points to a valid TSS segment description, which resides in a Global Descriptor Table (GDT) used by x86-based processors.

In addition to the TLB and TSS for a process or thread, other process data may include, for example, local temporary data used by the process during execution, initial data that is used as input data, or intermediate results from the execution of the process.

In this disclosure, a process is used as a specific example of executable code to illustrate various embodiments. However, as will be appreciated by those of ordinary skill in the art, the embodiments in the present disclosure can be generally applied to other examples of executable code, such as threads within a process or other tasks.

As shown in FIG. 1, the TLB and TSS for each process is stored as process data in main memory 102. In the example of FIG. 1, process data for process 1 is loaded from main memory 102 into processor 100, such as when a task scheduler allocates a time slice for the process to be executed. In more detail, the TLB for process 1 can be loaded into the TLB cache of processor 100 and the TSS can be loaded into one or more registers of processor 100. Process 1 is executed by processor 100 until a software interrupt or system call is received to switch to executing process n. The software interrupt can be initiated by a task scheduler of an OS to switch to executing process n. At that point, the process data for process 1, including the TLB and TSS for process 1, is stored back or unloaded in main memory 102.

The process data for process n, including the TLB and TSS for process n, is then loaded into processor 100 from main memory 102. Process n is executed by processor 100 and process data for process n is unloaded to main memory 102 upon completion of the execution of process n or when another interrupt or system call is received to switch to executing a different task at processor 100. The foregoing example of a conventional context switch can be expensive in terms of processing time and resources due to the load and store operations needed to access main memory 102 when performing a context switch.

In a multitasking OS, processes may occupy a variety of states. Some example states include a new state when a process is first created, a ready state when the process has been stored in main memory 102 and is waiting for execution, a running or executing state when the process has been chosen for execution, a waiting or idle state after the process has been running but is put on hold so that another process can be executed, and a terminated state when the process has completed execution or has been killed by an application or the OS.

Figure 2:
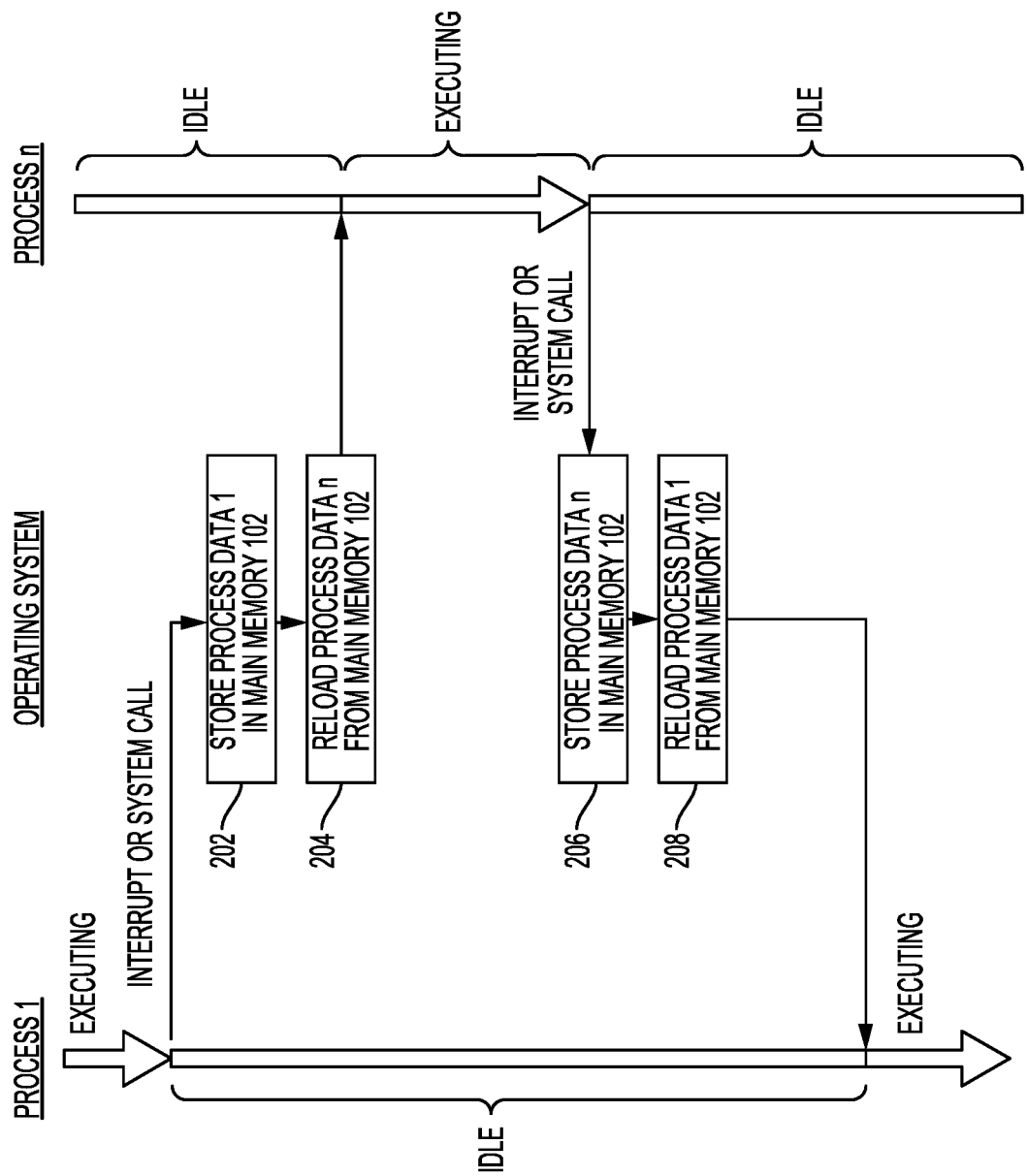
FIG. 2 illustrates an example of the conventional switching between processes executed by a processor.

FIG. 2 further illustrates an example of the conventional switching between processes executed by a processor. As shown in FIG. 2, process 1 executes until an interrupt or system call is received for a context switch. In block 202, process data for process 1 is stored in main memory 102 as process 1 enters a waiting or idle state. In block 204, process data for process n is reloaded from main memory 102, and process n enters a running or executing state while process 1 remains idle.

An interrupt or system call is then received during execution of process n as part of a context switch. The interrupt or system call may come from a task scheduler of a multitasking OS. In cases where the OS is a preemptive multitasking OS, the initiation of the interrupt or system call may occur after a designated amount of time that has been allocated to execution of process n, regardless of the status of the execution of process n.

In block 206, process data for process n is stored in main memory 102, and process n becomes idle. In block 208, process data for process 1 is reloaded from main memory 102 into processor 100. Process 1 then becomes active again and executes from the point where process 1 left off before receiving the interrupt or system call at block 202. In this regard, the TSS for process 1 may be used to identify the current state of execution for process 1 in re-activating the execution of process 1.

Example Processor Implementations

Figure 3:
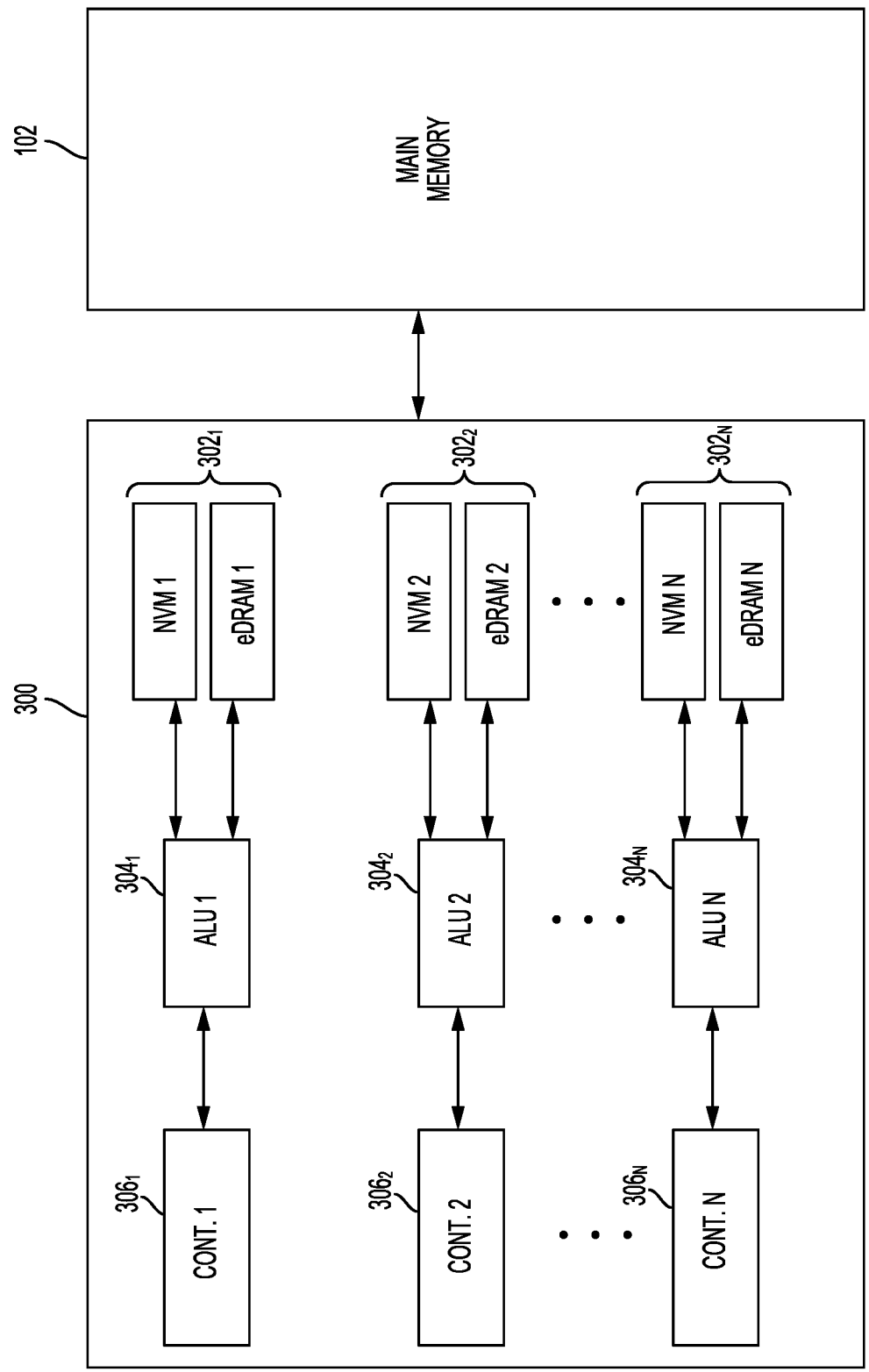
FIG. 3 is a block diagram of an example processor including processor memory pairs according to an embodiment.

FIG. 3 is a block diagram of example processor 300 including processor memory pairs 302 according to an embodiment. Processor 300 may include, for example, a CPU, an MPU, or an MCU. Processor 300 may also be part of an SoC. As shown in FIG. 3, processor 300 includes a plurality of processor cores denoted in FIG. 3 as Arithmetic Logic Units (ALUs) $304_1$ to $304_N$. Each core is associated with a processor memory pair 302 including a Non-Volatile Memory (NVM) location and a volatile memory location. In the example of FIG. 3, the volatile memory location is an embedded DRAM (eDRAM) location. In some implementations, the NVM in each processor memory pair 302 can include, for example, a non-volatile Storage Class Memory (SCM) such as Magnetoresistive Random Access Memory (MRAM) or Resistive RAM (ReRAM).

In some implementations, the NVM locations of the processor memory pairs 302 can form one or more NVM arrays. In addition, the volatile memory locations of the processor memory pairs 302 can form one or more volatile memory arrays. Control circuitry 306 for each core or ALU can pair volatile memory locations with NVM locations to form the processor memory pairs 302.

Control circuitry 306 can include, for example, circuitry or a specialized controller for executing instructions that manage processor memory pairs 302. In some implementations, control circuitry 306 can be combined with memory, such as registers or caches. The registers may include, for example, MRAM or another type of relatively quick access memory, such as Static RAM (SRAM). In some implementations, control circuitry 306 may be dedicated to controlling operation of a particular processor memory pair 302 associated with a core, as shown in FIG. 3 with control circuitry $306_1$ controlling operation of processor memory pair $302_1$ for ALU $304_1$. In other implementations, control circuitry 306 may control operation of multiple processor memory pairs 302 associated with multiple cores.

In the example of FIG. 3, control circuitry 306 can load process data from main memory 102 into a processor memory pair 302 corresponding to the ALU or core that is to execute the process. Each core or ALU may then execute the process by directly accessing process data for the process from its processor memory pair 302, as opposed to loading the process data from main memory 102.

In some implementations, a process is created in main memory 102 to reach a ready state. The process is then loaded into a processor memory pair 302 if a task scheduler of an OS selects the process for execution. In the running state, the process remains in the processor memory pair 302. If the processor memory pair 302 has enough free space after the core executing the process switches to executing a different process, the first process can remain in the associated processor memory pair while the process is in the waiting or idle state.

The foregoing arrangement of processor 300 including processor memory pairs 302 ordinarily allows for more process data to be stored locally in processor 300 so that changing from the execution of one task to another (e.g., from one process or thread to another process or thread) does not require storing and loading process data in main memory 102, as in the case of the conventional context switch examples discussed above with reference to FIGS. 1 and 2. Using the volatile memory locations and the NVM locations of processor memory pairs 302 can ordinarily allow enough space for storing all needed process data for a process near the core executing the process.

In this regard, control circuitry 306 may retain a certain amount of process data after a core has switched to executing a different task. Switching from one process to another with process data stored locally in processor memory pairs 302 can be performed using a relatively efficient memory access at different addresses, without having to store the process data back into main memory 102 (i.e., unloading), reading the new process data from main memory 102, and overwriting registers in processor 100. Switching from one process or thread to another can therefore be performed with less latency as compared to conventional context switching.

As discussed in more detail below with reference to FIG. 5, control circuitry 306 may store and retain TSSs and TLBs for different processes in corresponding NVM locations of respective processor memory pairs 302 for the cores that execute the process. Control circuitry 306 may also store and retain local temporary data for the different processes in corresponding volatile memory locations (e.g., in eDRAM) of the respective processor memory pairs 302 for the cores that execute the process.

Using a combination of NVM and volatile memory arrays instead of registers and traditional SRAM caches, can significantly improve the performance of a processor by reducing the need to use context switches to access main memory 102 each time the execution of a process is switched. In some cases, this may facilitate the use of a larger number of cores in a processor since less accesses of main memory 102 are needed.

In addition, the use of NVM in processor 300 can also provide a more cost-effective and power efficient architecture. In this regard, NVM is generally less expensive than SRAM and uses less power.

Figure 4:
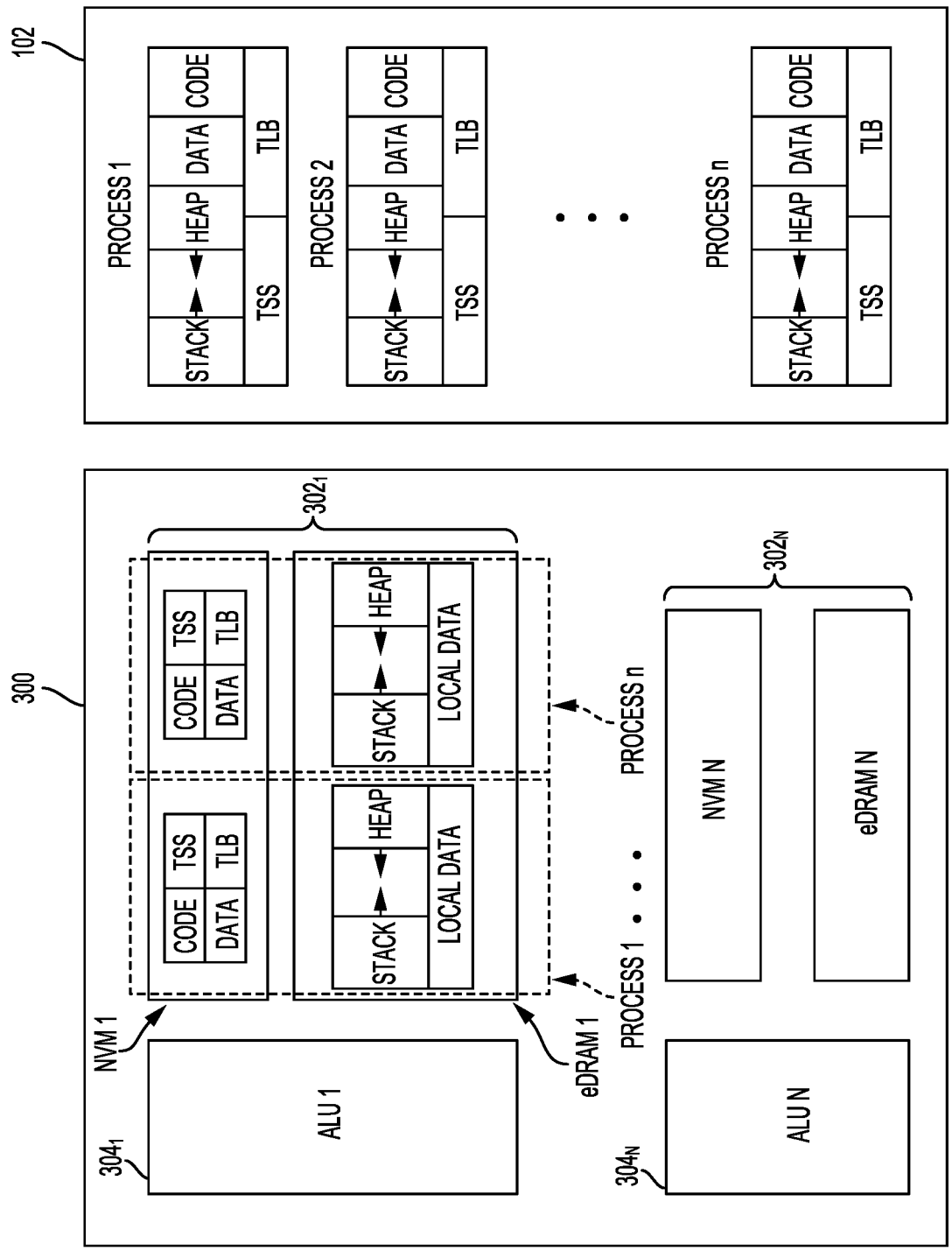
FIG. 4 illustrates an example of the storage of process data in processor memory pairs according to an embodiment.

FIG. 4 illustrates an example of the storage of process data in processor memory pairs 302 according to an embodiment. As shown in the example of FIG. 4, the NVM location, NVM 1, of processor memory pair 3021 stores process data for processes 1 to n, which are executed by ALU $304_1$. The process data for processes 1 to n includes program code for the processes, TSSs, data such as initial data or intermediate results from execution of the processes, and TLBs for processes 1 to n. This process data can be available for use by its associated core (i.e., ALU $304_1$ in FIG. 4) across power cycles of processor 300, since this process data is stored in an NVM location. The volatile memory location, eDRAM1, of processor memory pair 3021 stores temporary local data, the stack, and heap for processes 1 to n.

Main memory 102 is also shown in FIG. 4 as storing process data for processes 1 to n. As discussed in more detail below with reference to FIGS. 7 and 8, the process data may initially be loaded from main memory 102 into processor memory pairs 302, and eventually evicted from processor memory pairs 302 back to main memory 102 when an amount of free space available for storing process data in the processor memory pair has reached a threshold.

As will be appreciated by those of ordinary skill in the art, other implementations of processor 300 may include different components or a different arrangement of components than those shown in FIGS. 3 and 4. For example, other implementations may only include a single core or may share control circuitry 306 or processor memory pairs among multiple cores.

Figure 5:
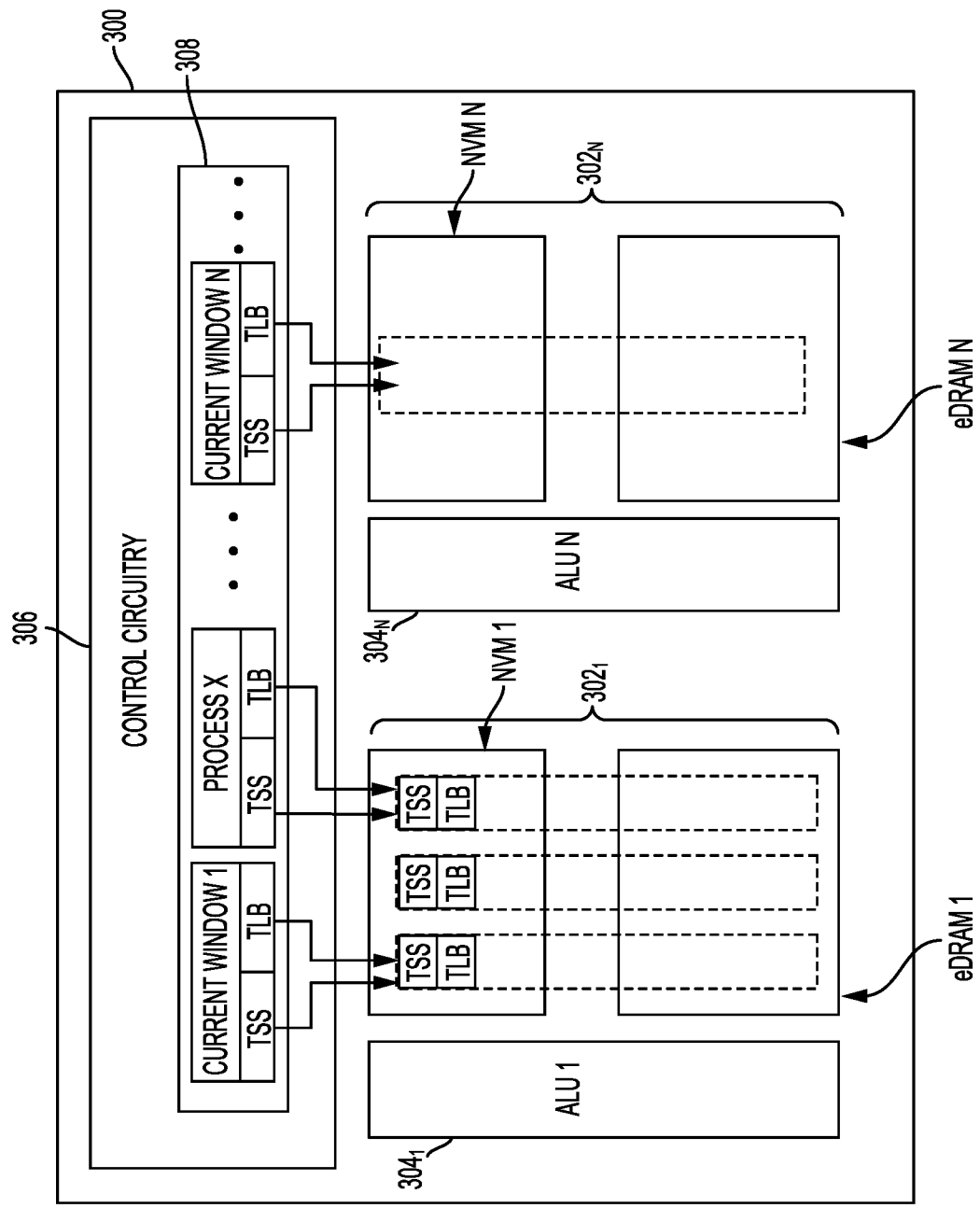
FIG. 5 illustrates the use of an array to point to corresponding Non-Volatile Memory (NVM) locations in processor memory pairs according to an embodiment.

FIG. 5 illustrates the use of array 308 to point to processor memory pairs 302 according to an embodiment. As shown in FIG. 5, array 308 includes pointers, such as a memory address or other index, that points to corresponding NVM locations in processor memory pairs 302 storing a TSS and a TLB for a given process being executed by processor 300. The pointers in array 308 may also point to the paired volatile memory locations through association with the NVM location pointed to by the pointer. In other implementations, array 308 may include a separate pointer for the volatile memory location.

Array 308 may include, for example, an array of registers included in control circuitry 306 that each store a pointer to an NVM location and an identifier for the process. In other implementations, different components, such as a cache, may be used instead of registers to store pointers and identifiers for the processes. In some implementations, the pointer may be a hashed index derived from an identification of the process so that it may not be necessary to store an identifier for the process. In some implementations, a pair of registers may be used in array 308 such that one register stores a pointer to an address in the NVM location storing the TSS for the process, and the other register stores a pointer to an address in the NVM location storing the TLB for the process.

In the example of FIG. 5, control circuitry 306 maintains a current window for each core in processor 300. In more detail, a current window can be created by control circuitry 306 by selecting at least one pointer in array 308 that corresponds to a process being executed by a core of processor 300.

In FIG. 5, current window 1 corresponds to ALU $304_1$, while current window N corresponds to ALU $304_N$. Control circuitry 306 selects the pointers for the process currently being executed by ALU $304_1$, and similarly selects the pointers for the other processes currently being executed by the other cores, such as for $ALU_N$ with current window N. A first pointer in the current window in the example of FIG. 5 points to a first address in the corresponding NVM location (e.g., an address in NVM 1 or NVM N) for the TSS of the currently executed process, and a second pointer in the current window points to a second address in the NVM location for the TLB of the currently executed process. Other implementations may use a different number of pointers, such as a single pointer, to point to the TSS and TLB in the NVM location for a currently executing process.

The use of array 308 can allow control circuitry 306 to select one of the available processes based on instructions received from an OS to load a process for execution by processor 300. Control circuitry 306 can shift a current window for a given core from one process to another process by pointing to an NVM location for the new process to provide direct access to a corresponding processor memory pair. This can ordinarily be done without having to load process data from main memory 102, and therefore reduces the impact of switching between processes.

In addition, in implementations where the pairing or association between the NVM locations and the volatile memory locations is fixed in processor memory pairs 302, the window only needs to point to the NVM location of the processor memory pair 302, since the volatile memory location (e.g., the eDRAM portion) is mapped in a one-to-one relationship to the NVM location. By accessing the NVM location through the window, the core can also access process data in the volatile memory location, such as the heap and stack for the process.

Unlike conventional processors, processor 300 does not require transferring process data from main memory 102 for process data that is already stored locally within processor 300 in processor memory pairs 302. This can provide a significant reduction in processing time. For example, a context switch for a processor with 32 registers, and other registers such as a Control and Status (CSR) register, Program Counter (PC) register, and nPC register, may, in the best case, consume 70 clock cycles per context switch. If we have one billion context switches during operation of such a processor, this could cost 70 billion clock cycles. At a processor speed of 1 GHz, these load and store operations would consume 70 billion nanoseconds or 70 seconds. The processor arrangement discussed above with respect to processor 300 in FIGS. 3 to 5 could eliminate this additional processing time, assuming processor memory pairs 302 are large enough to store all process data.

In some cases, it may be necessary to load process data into processor memory pairs 302 for process data that has not yet been stored in processor memory pairs 302 or for process data that may have been previously evicted from processor memory pairs 302 to create space for currently executing processes. Even in such cases, the use of processor memory pairs 302 within processor 300 would ordinarily reduce the processing time discussed for the example above by at least half.

In addition to reducing the amount of load and store operations, including processor memory pairs 302 within processor 300 also reduces the number of processor cache misses. Typically, L1/L2 processor caches are relatively small. As a result, process data needed for execution of a process may not be available in the processor caches, causing a cache miss, and the loading or reloading of process data from main memory. In contrast, the foregoing arrangement of processor 300 ordinarily reduces the number of processor cache misses, since process data is directly accessed by the core from processor memory pairs 302, which allow for more process data to be stored closer to the core.

Example Processes

Figure 6:
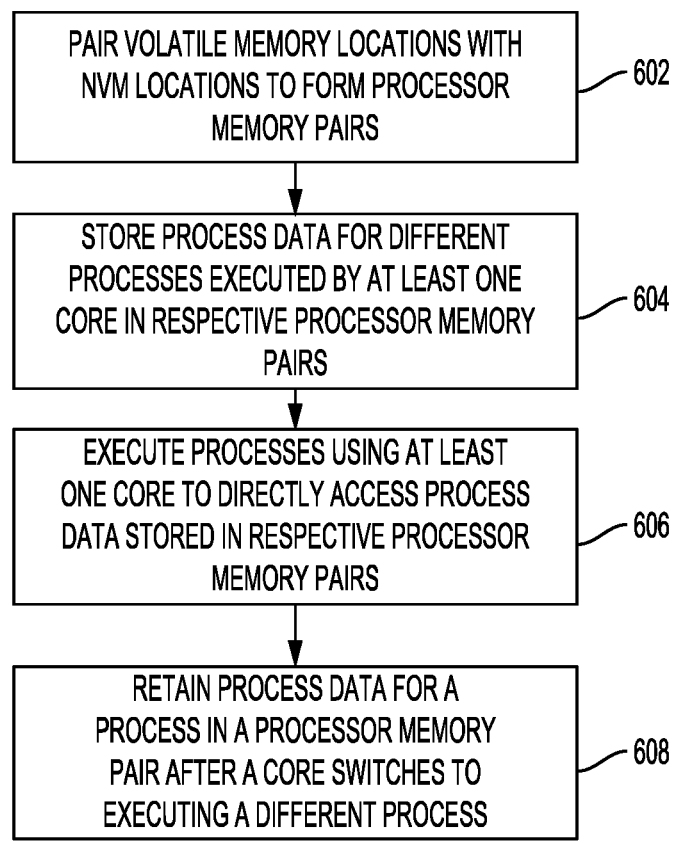
FIG. 6 is a flowchart for process execution using processor memory pairs according to an embodiment.

FIG. 6 is a flowchart for process execution using processor memory pairs according to an embodiment. The process of FIG. 6 may be performed by, for example, control circuitry 306 of processor 300.

In block 602, control circuitry 306 optionally pairs volatile memory locations with NVM locations to form processor memory pairs 302. In some implementations, the volatile memory locations can include one or more volatile memory arrays, such as one or more eDRAM arrays. Similarly, the NVM locations can include one or more NVM arrays, such as one or more MRAIVI or ReRAM arrays or other non-volatile SCM array. Control circuitry 306 in some implementations may pair the volatile memory locations and the NVM locations such that certain sizes or amounts of NVM and volatile memory are paired together using a fixed association, such as with an association table or other data structure accessed or managed by control circuitry 306. In other implementations, the volatile memory location and NVM locations may have been previously formed into processor memory pairs, such as during the manufacture or factory configuration of processor 300.

In block 604, control circuitry 306 stores process data, such as a TLB and a TSS, for each of the different processes executed by at least one core (e.g., ALUs $304_1$ to $304_N$ in FIGS. 3 to 5) in respective processor memory pairs. As discussed above, each processor memory pair 302 can be dedicated or tied to a particular core, such that the process data for the processes executed by the core are stored in the associated processor memory pair.

In block 606, the core or cores of processor 300 execute processes by directly accessing the process data for the processes stored in the processor memory pair. In some implementations, at least one pointer stored in an array managed by control circuitry 306 (e.g., array 308 in FIG. 5) may be used to point to locations in the processor memory pair storing the process data for the process, as discussed above with reference to FIG. 5. The core may then access the volatile memory locations and NVM locations for the process data without having to access such data from an intermediate storage location such as a level cache (e.g., L1/L2/L3 cache).

Temporary local data from the execution of the process may be stored in the volatile memory location of the associated processor memory pair. Intermediate results from execution of the process may be stored in the NVM location of the associated processor memory pair. Data for storage in a persistent storage, such as in a storage device external to processor 300 and main memory 102, may first be stored in the NVM location, before being flushed to main memory 102 with other updates to the process data, such as to the TSS. In other examples, data for storage in a persistent storage may be flushed directly from the processor memory pair to the persistent storage, thereby bypassing main memory 102.

In block 608, control circuitry 306 retains the process data in a processor process memory pair after a core switches to executing a different process. By retaining the process data in the processor memory pair, it is ordinarily possible to reduce the amount of load operations from main memory 102 when the process is executed again. However, since the storage space available in the processor memory pair is generally limited, control circuitry 306 may use an eviction policy, such as by evicting process data that has least recently been accessed by the core or least frequently accessed by the core when new process data needs to be loaded from main memory 102 and there is not enough space left in the processor memory pair to store the new process data.

Figure 7:
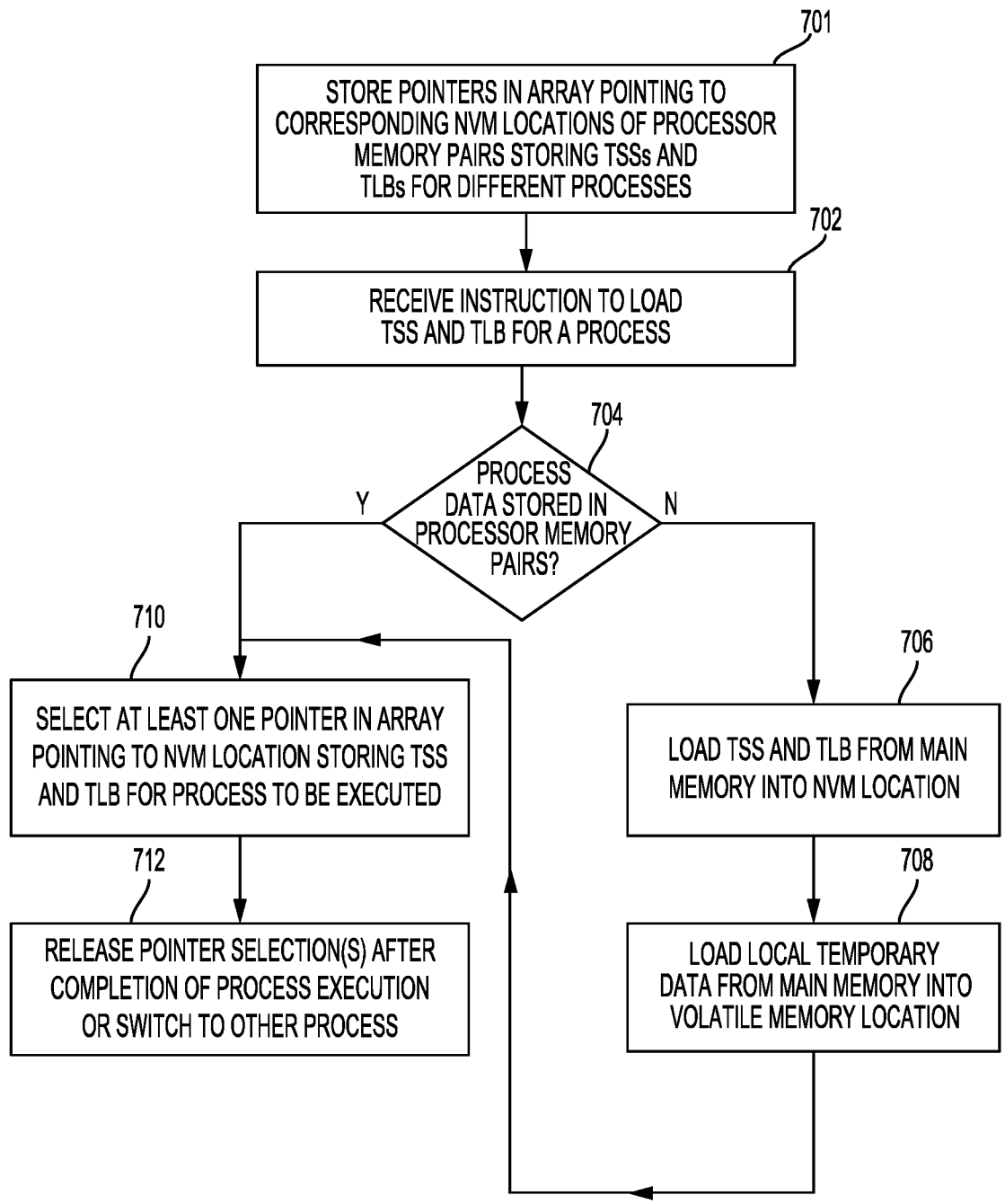
FIG. 7 is a flowchart for a loading process according to an embodiment.

FIG. 7 is a flowchart for a loading process that can be performed by control circuitry 306 according to an embodiment. In block 701, control circuitry 306 stores pointers in an array (e.g., array 308 in FIG. 5) pointing to corresponding NVM locations of processor memory pairs 302 that store TSSs and TLBs for different processes. As noted above with reference to FIG. 5, the pointers may include, for example, a memory address or other index for the NVM locations.

The array may also store an identifier for the different processes that are executed by the associated core. In other implementations, the pointer may be, for example, a hashed index that is derived from an identifier of the process such that it may not be necessary to store a separate identifier for the process. In addition, the array may also store pointers to volatile memory locations in processor memory pairs 302. However, as noted above, the pointer to the NVM location may in some implementations be used to access the volatile memory location for the process based on the association between the volatile memory location and NVM location for a given processor memory pair.

In block 702, control circuitry 306 receives an instruction to load a TSS and a TLB for a process. The instruction to load the TSS and/or the TLB may come from, for example, an OS task scheduler.

In block 704, control circuitry 306 determines whether the process data for the process is stored in processor memory pairs 302. In some implementations, this may be performed by searching a CAM of control circuitry 306, such as a high-speed associative memory or array. An index, such as a virtual address or a hash function result representing the process to be loaded can be used to search the CAM to determine whether the process data is stored in processor memory pairs 302. In other implementations, a different type data structure may be used to determine whether the process data is stored in process memory pairs 302.

For example, array 308 in FIG. 5 may be used to determine whether process data for a particular process is stored in process memory pairs 302 by attempting to select a pointer or pointers for the process. If a pointer or pointers are successfully selected for a process, it is determined that the process data for the process is stored in process memory pairs 302. In such implementations, the determination of block 704 in FIG. 7 and the selection of at least one pointer in block 710 can be combined, such that if the selection fails, the process proceeds with block 706 instead of block 712.

Returning to the example of FIG. 7, if it is determined in block 704 that the process data is not stored in processor memory pairs 302, control circuitry 306 in block 706 loads the TSS and the TLB for the process from main memory 102 into an NVM location. The TSS and the TLB may be loaded into an NVM location in a processor memory pair 302 associated with the core allocated to executing the process.

In block 708, local temporary data for the process is loaded from main memory 102 into a volatile memory location in a processor memory pair 302 associated with the core allocated to executing the process. The process then proceeds to block 710.

If it is determined in block 704, that the process data is stored in processor memory pairs 302, control circuitry 306 in block 710 creates a window for the process by selecting at least one pointer pointing to the corresponding NVM location in processor memory pairs 302 storing the TSS and the TLB for the process. As discussed above, each core may have a window with one or more pointers for a process being executed by the core.

In block 712, the pointer selection or selections made in block 710 is released after completion of the process execution or after the core executing the process switches to executing a different process. A new pointer or pointers may then be selected as a new window to facilitate the core's direct access of process data from processor memory pairs 302 for the new process to be executed by the core.

The foregoing loading process ordinarily reduces the operational cost of switching from executing one process or thread to executing another process or thread, as compared to conventional context switching that requires loading new process data from main memory 102 and storing process data for the current process in main memory 102.

Figure 8:
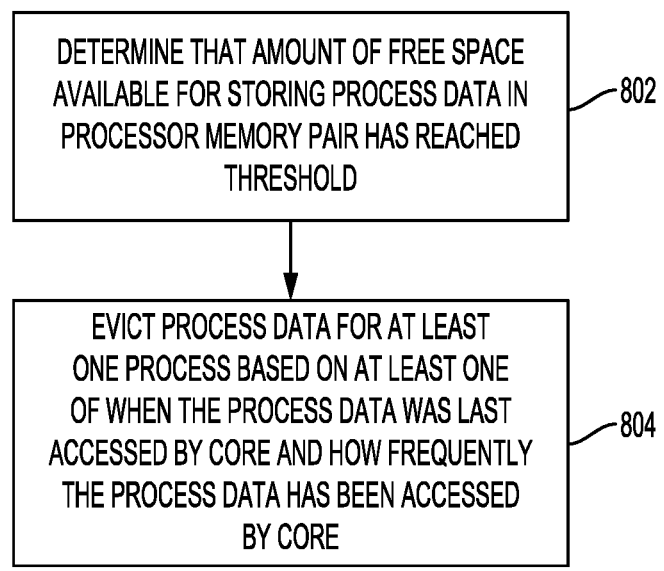
FIG. 8 is a flowchart for a process data eviction process according to an embodiment.

FIG. 8 is a flowchart for a process data eviction process according to an embodiment that can be performed by control circuitry 306. The process of FIG. 8 can be performed on a per core and associated memory pair basis to ensure that there is room in the processor memory pair for loading new process data for a process to be executed by the associated core. In addition to evicting process data to make room for other process data, final results from the execution of a process may also need to be evicted or flushed to main memory 102 for storage in a persistent storage (e.g., Hard Disk Drive (HDD) or Solid State Drive (SSD)) external to processor 300 and main memory 102. In other implementations, the final results may instead be flushed directly to the persistent storage without having to be flushed or evicted to main memory 102.

In block 802, control circuitry 306 determines that the amount of free space available for storing process data in a processor memory pair has reached a threshold. In some implementations, the threshold can be when one of the NVM location or the volatile memory location for the processor memory pair has become full or has less than a predetermined amount of free space available, such as an average size required for storing a TSS and a TLB.

In block 804, control circuitry 306 evicts process data for at least one process from the processor memory pair. Process data is identified for eviction based on at least one of when the process data was last accessed by the core and how frequently the process data has been accessed by the core. In other implementations, a different criterion may be used to determine which process data to evict. For example, control circuitry 306 may identify or flag certain process data as having a higher priority than other process data based on a priority of the process, such that the identified process data is retained in processor memory pairs despite its access characteristics.

The evicted process data is stored in main memory 102, and the NVM location and volatile memory location occupied by the evicted process data is made available to be overwritten by new process data for a process to be executed by the core.

As discussed above, the use of processor memory pairs 302 in processor 300 ordinarily reduces the amount of store and load operations to access process data stored in main memory 102. The use of processor memory pairs 302 also allow for more process data to be stored closer to a core so as to avoid a cache miss during execution of a process. In addition, the cost and power consumption of NVM arrays and volatile memory arrays, such as eDRAM, are generally less for a given amount of data as compared to SRAM that is typically used in conventional processors.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or a controller to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, and modules described in connection with the examples disclosed herein may be implemented or performed with a processor or a controller, such as, for example, a CPU, an MPU, an MCU, or a DSP, and can include, for example, an FPGA, an ASIC, or other programmable logic device, discrete gate or transistor logic, discrete hardware components, or any combination thereof designed to perform the functions described herein. A processor or controller may also be implemented as a combination of computing devices, e.g., a combination of a DSP and an MPU, a plurality of MPUs, one or more MPUs in conjunction with a DSP core, or any other such configuration. In some implementations, the controller or processor may form at least part of an SoC.

The activities of a method or process described in connection with the examples disclosed herein may be embodied directly in hardware, in a software module executed by a processor or a controller, or in a combination of hardware and software. The steps of the method or algorithm may also be performed in an alternate order from those provided in the examples. A software module may reside in RAM memory, flash memory, ROM memory, EPROM memory, EEPROM memory, other types of solid state memory, registers, hard disk, removable media, optical media, or any other form of storage medium known in the art. An exemplary storage medium is coupled to a processor or a controller such that the processor or the controller can read information from, and write information to, the storage medium. In the alternative, the storage medium may be integral to the processor or the controller.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A processor, comprising:
   at least one core for executing processes;
   one or more volatile memory arrays;
   one or more Non-Volatile Memory (NVM) arrays, wherein volatile memory locations in the one or more volatile memory arrays are paired with NVM locations in the one or more NVM arrays to form processor memory pairs, and wherein the one or more volatile memory arrays and the one or more NVM arrays are included in the processor; and
   control circuitry configured to:
   store process data for different processes executed by the at least one core in the respective processor memory pairs, wherein the at least one core is configured to execute processes by directly accessing process data stored in the respective processor memory pairs;
   store references to corresponding NVM locations of the respective processor memory pairs;
   in response to an instruction to load process data for a process to be executed by a core of the at least one core, select at least one reference to the NVM location storing a Task State Segment (TSS) and a Translation Lookaside Buffer (TLB) for the process to be executed by the core; and
   store local temporary data for the process in the volatile memory location of the processor memory pair for the process.

2. The processor of claim 1, wherein the control circuitry is further configured to retain process data for a process in a processor memory pair after a core of the processor switches from executing the process to executing a different process.

3. The processor of claim 1, wherein the control circuitry is further configured to store a TSS and a TLB for each of the different processes in a corresponding NVM location of the respective processor memory pairs.

4. The processor of claim 1, wherein the control circuitry is further configured to store pointers in an array pointing to corresponding NVM locations of the respective processor memory pairs.

5. The processor of claim 1, wherein the control circuitry is further configured to store local temporary data for the different processes in corresponding volatile memory locations of the respective processor memory pairs.

6. The processor of claim 1, wherein the control circuitry is further configured to:
   receive an instruction to load process data for a process;
   determine whether process data for the process is stored in the processor memory pairs; and
   in response to determining that the process data for the process is not stored in the processor memory pairs, load the process data from a main memory into a processor memory pair.

7. The processor of claim 1, wherein the control circuitry is further configured to:
   determine that an amount of free space available for storing process data in a processor memory pair has reached a threshold; and
   in response to determining that the amount of free space has reached the threshold, evict process data for at least one process from the processor memory pair.

8. The processor of claim 7, wherein the control circuitry is further configured to evict the process data for the at least one process based on at least one of when the process data was last accessed by a core and how frequently the process data has been accessed by the core.

9. A method for operating a processor including processor memory arrays including one or more volatile memory arrays and one or more Non-Volatile Memory (NVM) arrays, the method comprising:
   pairing volatile memory locations in the one or more volatile memory arrays with respective NVM locations in the one or more NVM arrays to form processor memory pairs;
   storing process data for different processes executed by at least one core of the processor in respective processor memory pairs;
   storing references to corresponding NVM locations of the respective processor memory pairs;

in response to an instruction to load process data for a process to be executed by a core of the at least one core, selecting at least one reference to an NVM location storing a Task State Segment (TSS) and a Translation Lookaside Buffer (TLB) for the process to be executed by the core; and storing local temporary data for the process in the volatile memory location of the processor memory pair for the process.

10. The method of claim 9, further comprising executing processes by using the at least one core to directly access the process data stored in the respective processor memory pairs.

11. The method of claim 9, further comprising storing a TSS and a TLB for each of the different processes in a corresponding NVM location of the respective processor memory pairs.

12. The method of claim 9, further comprising storing local temporary data for the different processes in corresponding volatile memory locations of the respective processor memory pairs.

13. The method of claim 9, further comprising:
receiving an instruction to load process data for a process;
determining whether process data for the process is stored in the processor memory pairs; and
in response to determining that the process data for the process is not stored in the processor memory pairs, loading the process data from a main memory into a processor memory pair.

14. The method of claim 9, further comprising:
determining that an amount of free space available for storing process data in a processor memory pair has reached a threshold; and
in response to determining that the amount of free space has reached the threshold, evicting process data for at least one process from the processor memory pair.

15. The method of claim 14, further comprising evicting the process data for the at least one process based on at least one of when the process data was last accessed by a core and how frequently the process data has been accessed the core.

16. A non-transitory computer readable medium storing computer-executable instructions, wherein when the computer-executable instructions are executed by control circuitry of a processor, the computer-executable instructions cause the control circuitry to:
store process data for different processes executed by at least one core of the processor in respective processor memory pairs of the processor, wherein the respective processor memory pairs include volatile memory locations paired with Non-Volatile Memory (NVM) locations, and wherein the volatile memory locations and the NVM locations are included in the processor;
store references to corresponding NVM locations of the respective processor memory pairs;
in response to an instruction to load process data for a process to be executed by the core, select at least one reference to the NVM location storing a Task State Segment (TSS) and a Translation Lookaside Buffer (TLB) for the process to be executed by the core; and
store local temporary data for the process in the volatile memory location of the processor memory pair for the process.

17. The non-transitory computer readable medium of claim 16, wherein the core is configured to execute processes by directly accessing process data stored in the respective processor memory pairs.

18. The non-transitory computer readable medium of claim 16, wherein when the computer-executable instructions are executed by the control circuitry, the computer-executable instructions further cause the control circuitry to store a TSS and a TLB for each of the different processes in a corresponding NVM location of the respective processor memory pairs.

19. The method of claim 9, further comprising retaining process data for a process in a processor memory pair after a core of the processor switches from executing the process to executing a different process.

* * * * *